United States Patent
Wang

(10) Patent No.: US 7,512,777 B2
(45) Date of Patent: Mar. 31, 2009

(54) METHOD AND SYSTEM FOR MAINTAINING SYSTEM MANAGEMENT BIOS

(75) Inventor: Chin-Yu Wang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 477 days.

(21) Appl. No.: 11/446,133

(22) Filed: Jun. 5, 2006

(65) Prior Publication Data

US 2007/0174603 A1 Jul. 26, 2007

(30) Foreign Application Priority Data

Jan. 26, 2006 (TW) ............................. 95103213 A

(51) Int. Cl.
*G06F 15/177* (2006.01)
(52) U.S. Cl. ................ 713/1; 713/2; 713/100
(58) Field of Classification Search ............... 713/1, 713/2, 100
See application file for complete search history.

(56) References Cited

U.S. PATENT DOCUMENTS

| 5,918,047 | A | | 6/1999 | Leavitt et al. |
|---|---|---|---|---|
| 6,122,732 | A | * | 9/2000 | Ahuja ............................ 713/1 |
| 6,185,696 | B1 | | 2/2001 | Noll |
| 6,732,267 | B1 | * | 5/2004 | Wu et al. .................... 713/100 |
| 6,745,329 | B1 | | 6/2004 | Kao et al. |
| 6,757,838 | B1 | | 6/2004 | Chaiken et al. |
| 6,804,773 | B1 | * | 10/2004 | Grigsby et al. ................. 713/1 |
| 7,203,831 | B2 | * | 4/2007 | Wu et al. ..................... 713/100 |
| 7,363,480 | B1 | * | 4/2008 | Righi et al. .................... 713/1 |
| 2003/0074657 | A1 | | 4/2003 | Bramley |
| 2003/0126493 | A1 | | 7/2003 | Lee |
| 2003/0145008 | A1 | | 7/2003 | Burrell |
| 2004/0025002 | A1 | | 2/2004 | Cepulis et al. |
| 2004/0193865 | A1 | | 9/2004 | Nguyen et al. |
| 2005/0132084 | A1 | | 6/2005 | Cheng et al. |
| 2006/0224874 | A1 | * | 10/2006 | Lu et al. ....................... 713/1 |

FOREIGN PATENT DOCUMENTS

| EP | 0 803 812 B1 | 7/2002 |
|---|---|---|
| GB | 2 290 890 A | 1/1996 |
| TW | 594579 B | 6/2004 |
| TW | 200519749 | 6/2005 |
| TW | 246010 B | 12/2005 |

* cited by examiner

*Primary Examiner*—Abdelmoniem Elamin
(74) *Attorney, Agent, or Firm*—Muncy, Geissler, Olds & Lowe, PLLC

(57) ABSTRACT

A method and system for maintaining a System Management BIOS (SMBIOS) in a computer system is provided. According to the proposed method and system, the BIOS of the computer system is updated first. The reserved SMBIOS information pre-stored in a memory unit is then stored into the BIOS of the computer system after the BIOS is updated. While the computer system is restarted, the reserved SMBIOS information can be written back into the rebuilt SMBIOS block.

20 Claims, 5 Drawing Sheets

METHOD AND SYSTEM FOR MAINTAINING SYSTEM MANAGEMENT BIOS

RELATED APPLICATIONS

The present application is based on, and claims priority from, Taiwan Application Serial Number 95103213, filed Jan. 26, 2006, the disclosure of which is hereby incorporated by reference herein in its entirety.

BACKGROUND

1. Field of Invention

The present invention relates to a method and system for maintaining reserved information of a system management basic input and output system (SMBIOS) in a computer system. More particularly, the present invention relates to a method and system for maintaining reserved information of an SMBIOS, that keeps the reserved SMBIOS information identical before and after updating the BIOS that comprises the SMBIOS in the computer system.

2. Description of Related Art

With advances in the fabrication of electronic components and computer systems a large variety of computer devices are becoming increasingly available to the public. Besides well known personal computers, portable electronic devices equipped with specific functionalities, such as MP3 players, digital cameras, portable phones and personal digital assistants (PDAs), etc., are seen as a kind of computer systems.

In most computer systems, a basic input and output system (BIOS) is utilized to control input units and output units. The BIOS initializes input units and output units of a computer system for the user when the computer system boots. Hence, along with an increase in the amount and the enhancement of the functions of the input units and the output units of the computer system, the BIOS sometimes needs updating to ensure the BIOS has the ability to control these updated input units and output units of the computer system. Currently most computer systems store the BIOS in a re-writable non-volatile memory, such as a flash memory, for convenient updating.

The updating process includes erasing the original BIOS from the non-volatile memory, and then building a new BIOS in the non-volatile memory. That is, the previously stored BIOS (the original BIOS) is completely cleared off the non-volatile memory. However, sometimes, some previous BIOS information is preferably kept in the new BIOS. Some important part of the data of the System Management BIOS (SMBIOS) is one example.

The SMBIOS is stored in the BIOS and records computer system hardware configuration such as the version of the BIOS, the universal unique identifier (UUID) of the computer system, the manufacturer and the series number of the main board, specification of the central unit, the sizes of the main memory and the flash memory, and the usage status of the data transmission interface socket, for the management of the computer system.

As described above, the SMBIOS block is rebuilt and the data of the previous SMBIOS is lost when the BIOS is updated. Although the data of the SMBIOS is also rebuilt, the rebuilt data of the SMBIOS may possibly be different from the original data of the SMBIOS due to the variation of the hardware configuration of the computer system.

For some reason, some part of the reserved SMBIOS information is of more importance. It is preferable to retain this part of the reserved SMBIOS information when the BIOS is updated. For example, it is preferable to retain the factory settings of the SMBIOS information on public computers so that if any system hardware is stolen or maliciously changed it can be determined immediately. Accordingly, the reserved SMBIOS information is usually backed up in other non-volatile memory, such as the CMOS register within the chipset of the computer system in order to keep the previous reserved SMBIOS information from totally disappearing when the BIOS was updated.

However, due to the increasing complexity of hardware configurations of the computer system, the size of the reserved information needs to increase. Hence, it becomes increasingly more difficult to find enough space to backup the important reserved SMBIOS information in the computer system (the storage space of the CMOS register is limited).

For the foregoing reasons, there is a need for an advanced mechanism to maintain the identity of the preserved SMBIOS information when the BIOS is updated.

SUMMARY

The present invention is directed to a method and related system for maintaining SMBIOS to satisfy the need to preserve the identity of the preserved SMBIOS information when the BIOS is updated.

It is therefore an aspect of the present invention to provide a method and system to maintain the reserved SMBIOS information in a computer system.

It is another aspect of the present invention to provide a method and system for maintaining the content of the reserved SMBIOS information when the BIOS is updated.

It is still another aspect of the present invention to provide a method and system to maintain the reserved SMBIOS information without requiring additional non-volatile memory space.

It is a fourth aspect of the present invention to provide a method and system for improving the security of the hardware of the computer system.

In accordance with the foregoing and other aspects of the present invention, a method for maintaining SMBIOS in a computer system is introduced. The introduced method first updates the BIOS of the computer system, and stores the reserved information of SMBIOS, an identification code and an error detecting code to the updated BIOS. After the computer system is rebooted, the reserved SMBIOS information stored in the BIOS is temporarily stored to a memory unit, and the SMBIOS block is rebuilt in the BIOS. Hence the identification code and the error detecting code can be utilized to determine whether the reserved SMBIOS information is complete and correct. Finally, the reserved SMBIOS information in the memory unit retrieved previously can be written back to the rebuilt SMBIOS block.

In the foregoing, it is assumed that the computer system copies content of the BIOS, including the reserved information of the SMBIOS, to the memory unit when booting. For the computer system where the aforementioned assumption does not stand, a step for storing the reserved SMBIOS information within the BIOS to the memory unit in advance is necessary.

In accordance with the aforementioned method, a system for maintaining SMBIOS in a computer system is introduced. The introduced system for maintaining SMBIOS is installed in a computer system, including a BIOS updating module, a SMBIOS restoring module, a booting module, a temporary storing module, a SMBIOS rebuilding module, and a SMBIOS updating module. The BIOS updating module is for performing an updating process to the BIOS of the computer system. The SMBIOS restoring module is utilized to store the reserved SMBIOS information previously stored in a memory unit to the BIOS after the BIOS updating module finishes the updating process, wherein an identification code and an error detecting code can be stored back in the BIOS at the same time. The booting module is adopted for rebooting the computer system after the SMBIOS restoring module finishes the storing process. The temporary storing module is for temporarily storing the reserved SMBIOS information within the BIOS previously stored by the SMBIOS restoring module to the memory unit when the system is booted for the first time after the BIOS is updated. Here the identification code and the error detecting code can be further utilized to determine whether the reserved SMBIOS information is correct. The SMBIOS rebuilding module is utilized to rebuild a SMBIOS block in the BIOS after the temporary storing module finishes its storing process. The SMBIOS updating module is for updating the SMBIOS block of the BIOS to the reserved SMBIOS information block stored in the memory unit after the SMBIOS rebuilding module finishes building the SMBIOS block in the BIOS.

Similarly, for the computer system that is unable to automatically copy the reserved information of the BIOS, including the reserved SMBIOS information, to the memory unit in advance, the introduced system further includes a copying module for storing the reserved SMBIOS information within the BIOS to the memory unit before the updating module functions.

In conclusion, the invention allows the identity of the preserved SMBIOS information to be well maintained through the BIOS updating, such that the BIOS updating needs of modern computers are met.

Moreover, the invention allows the computer system that is unable to automatically copy the reserved information of the BIOS to the memory unit in advance to implement the proposed effect as well by introducing an additional step and the corresponding module of storing the reserved SMBIOS information within the BIOS to the memory unit in advance.

These and other features, aspects, and advantages of the present invention will become better understood with reference to the following description, figures, and appended claims.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1A:
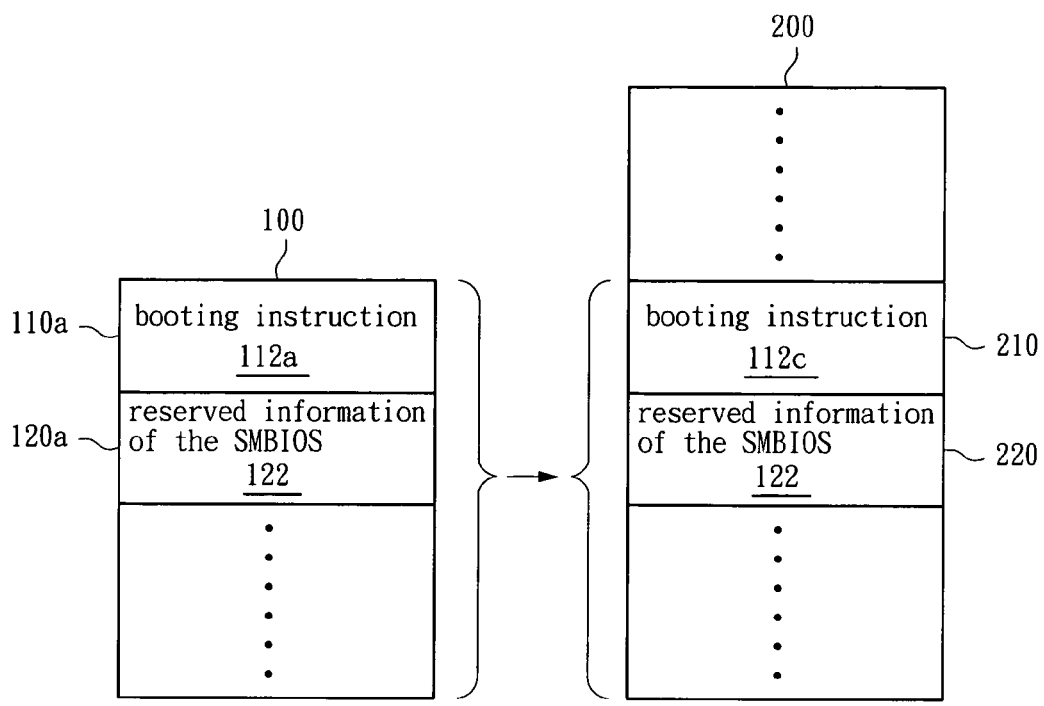
FIGS. 1A-1D are diagrams of a BIOS and a memory unit of a computer system when the method of the present invention performs in the computer system.

Reference will now be made in detail to the present preferred embodiments of the invention, examples of which are illustrated in the accompanying drawings. Wherever possible, the same reference numbers are used in the drawings and the description to refer to the same or like parts.

The reserved SMBIOS information stored within the BIOS of a computer system brings convenience to the management of the computer system. Hence it is important to keep and to ensure the SMBIOS is complete and correct. It is especially important for computer systems that require high security that the reserved SMBIOS information is not easily changed after the fabrication and installation of the computer systems. However, it is sometimes necessary for the BIOS of the computer system to be updated as the functions of the computer system are increased, while the updating process of the BIOS may erase the reserved SMBIOS information within the BIOS. Therefore, the present invention is introduced to utilize the original BIOS of the computer system as a non-volatile memory for temporarily storing the reserved SMBIOS information during the updating process of the BIOS, such that the predefined reserved SMBIOS information can be preserved through the BIOS updating process.

FIGS. 1A to 1D are utilized to illustrate the implementation flow of an embodiment of the present invention.

FIG. 1A shows a BIOS 100 and a memory unit 200. A booting instruction 112*a* and reserved information 122 of the SMBIOS are respectively stored in a booting block 110*a* and a SMBIOS block 120*a* within the BIOS 100. The booting instruction 112*a* comprises a series of instruction code utilized to initialize the computer system in the booting process by the BIOS 100. In modern common computer systems, BIOS 100 data is mostly stored in the non-volatile memory, such as flash memory. Hence, the data of the BIOS 100 is usually copied to and then stored in the memory unit 200, such as random access memory (RAM), for the computer system to execute instructions more quickly when booting up.

Therefore, when the computer system starts up, the BIOS 100 initializes a public block within the memory unit 200 in advance for the BIOS 100 to access. The BIOS 100 then stores its data and with a decompressing program into the public block because a part of the BIOS data being stored may be compressed, such as the booting instruction 112*a*. Finally, the decompressing program may be executed within the memory unit 200 to recover the compressed BIOS data to the uncompressed BIOS data. For instance, the booting instruction 112*a* may be restored to the booting instruction 112*c*. As illustrated in the figure, the public block of the memory unit 200 comprises a booting block 210 and a SMBIOS block 220, wherein the decompressed booting instruction 112*c* and all the reserved SMBIOS information 122 are stored, respectively. Please note that, in the present embodiment, the SMBIOS block 120*a* and the SMBIOS block 220 may contain not only the reserved SMBIOS information 122, but also some user-defined reserved information. That is, the SMBIOS block should include some specifically reserved SMBIOS information and normal SMBIOS information, in which the reserved information may be defined by the user. For example, the reserved SMBIOS information 122 may include some or all of the following: BIOS version information, the universal unique identifier (UUID) of the computer system, the manufacturer and the series number of the main board, the specification of the central unit, sizes of the main memory and the flash memory, and the usage status of the data transmission interface socket of the computer system.

Figure 1B:
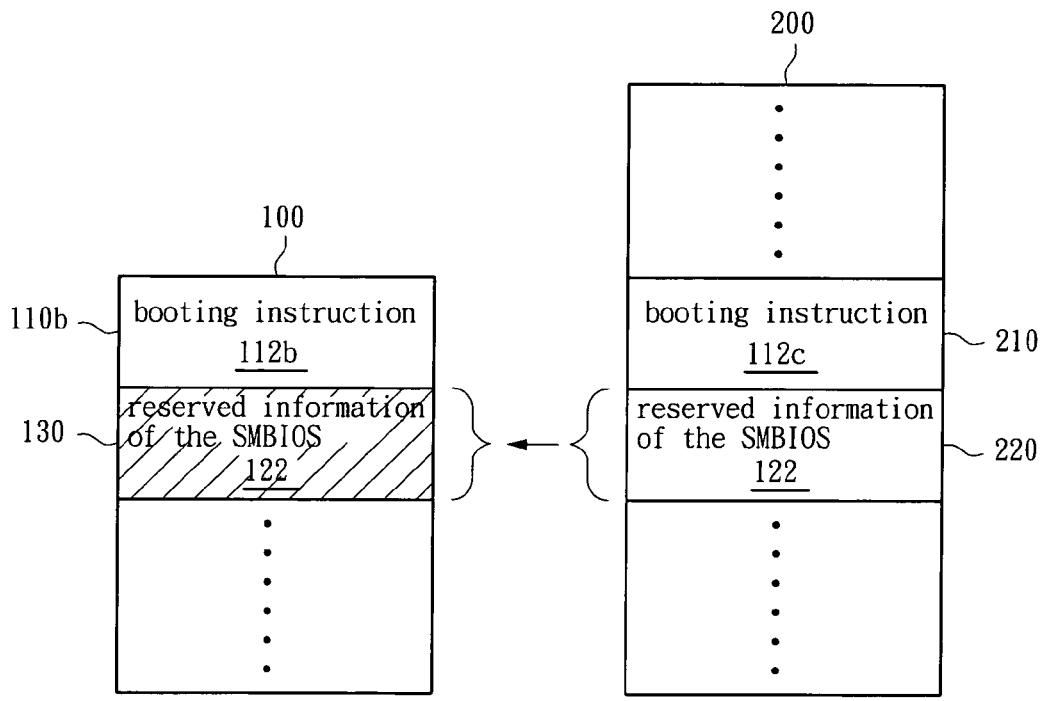

FIG. 1B displays a diagram showing the BIOS 100 during the updating process. In FIG. 1B, the previous booting block 110*a* within the BIOS 100 is re-regulated to the booting block 110*b*, and the previous booting instruction 112*a* is updated to a booting instruction 112*b* also stored in the booting block 110*b*. However, the previous SMBIOS block 120*a* is totally eliminated with the reserved information 122 of the SMBIOS therein. The reserved SMBIOS information 122 of the SMBIOS is also stored in the SMBIOS block 220 and preferentially preserved, the reserved information 122 stored in the SMBIOS block 220 may be copied to an arbitrary temporary storage block 130 in the BIOS 100. Meanwhile, an identification code and an error detecting code of the reserved SMBIOS information can also be stored in the temporary storage block 130. The location of the temporary storage block 130 can be the same as the location of the previous SMBIOS block 120a (pleaser refer to FIG. 1A). However, since the format of the temporary storage block 130 is different from a standard SMBIOS block format, the reserved SMBIOS information 122 cannot be correctly processed therein. The temporary storage block 130 can only provide a temporary storage space for the reserved SMBIOS information 122, the identification code and the error detecting code.

Figure 1C:
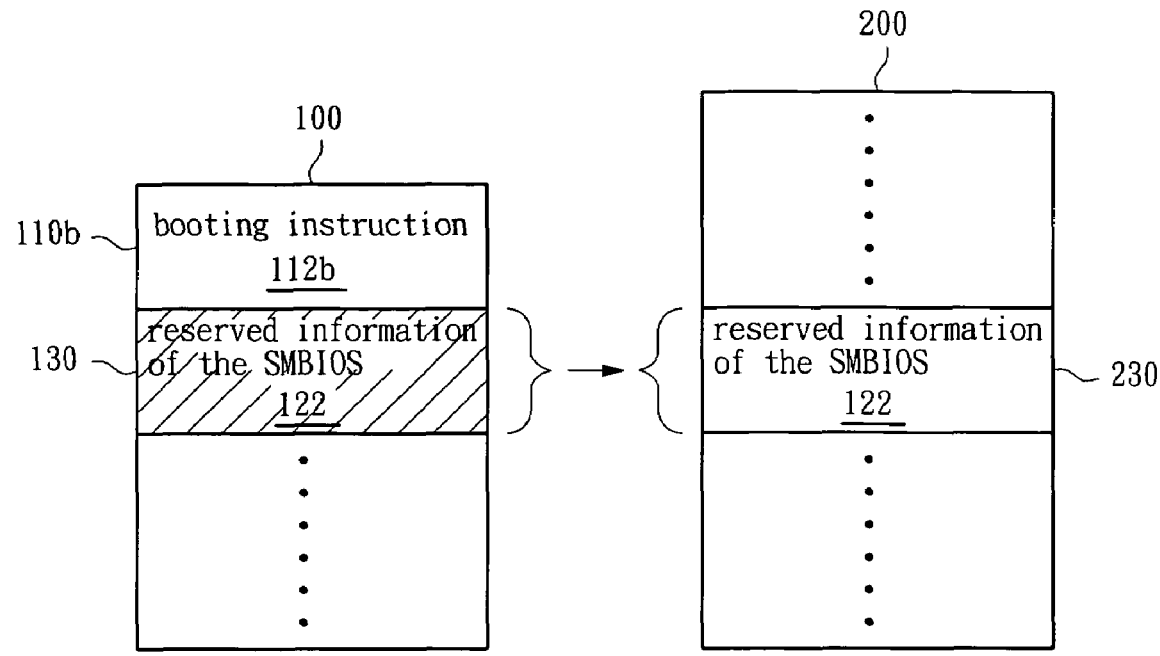

Usually, the computer system is rebooted after the BIOS is updated to ensure the function of the updated BIOS. FIG. 1C illustrates the rebooted computer system. In this embodiment, the BIOS 100 initializes a public block, such as the temporary storage block 230, in the memory unit 200 for accessing as well in the first booting procedure after the updating process. The reserved information 122 of the SMBIOS in the temporary storage block 130 may then be moved to a temporary storage block 230 in the memory unit 200 in order to prepare establishing a new SMBIOS block in the BIOS 100. At the same time, the identification code and the error detecting code may be utilized to determine whether the reserved SMBIOS information within the temporary storage block is still complete. When the booting process has not been performed completely, the little data is stored in the memory unit 200.

Please note that although in both steps shown FIG. 1B and FIG. 1C the reserved SMBIOS information 122 stored in the BIOS 100 is stored in the memory unit 200, the reserved SMBIOS information 122 may also be stored not only in some predetermined memory but in any accessible computer system storage device. That is, the memory unit 200 illustrated in FIG. 1B may include the hard disk of the computer system, and the memory unit 200 illustrated in FIG. 1B may include the main memory of the computer system.

Figure 1D:
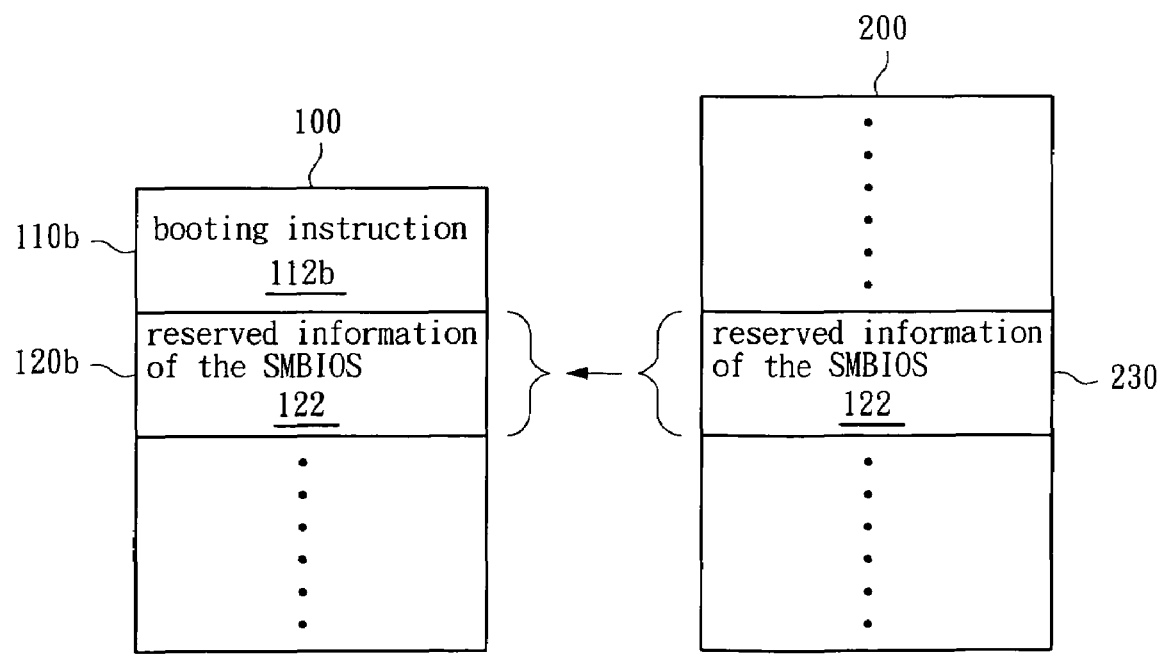

The result of the method of the present embodiment is illustrated in FIG. 1D. It can be seen that the SMBIOS block 120b is built in the BIOS 100. Accordingly, the reserved information 122 of the SMBIOS in the temporary storage block 230 within the memory unit 200 can be restored to the SMBIOS block 120b within the BIOS 100. Therefore, the reserved information 122 of the SMBIOS can be utilized correctly. It is observed more clearly by comparing the BIOS 100 in FIG. 1A with that in FIG. 1D. After using the method of the present invention, data and each block of the BIOS 100 are updated successfully with the exception of the reserved SMBIOS information 122, which remains the same as before the updating process.

To integrate the functions mentioned above, FIG. 2A illustrates the flowchart 300a of one embodiment of the present invention. Firstly, in step 302, an updating process updates the BIOS of the computer system. In step 304, the reserved SMBIOS information, such as an identification code and an error detecting code of the SMBIOS, copied to the memory unit in advance is restored to a temporary storage block of the BIOS. The computer system is rebooted in step 306, and the SMBIOS within the BIOS of the rebooted computer system is copied to the memory unit in step 308. In step 310, the SMBIOS block for the reserved SMBIOS information is rebuilt in the BIOS. Finally, in the step 312, the reserved SMBIOS information temporarily stored in the memory unit is updated to the newly-built SMBIOS block within the BIOS.

Figure 2A:
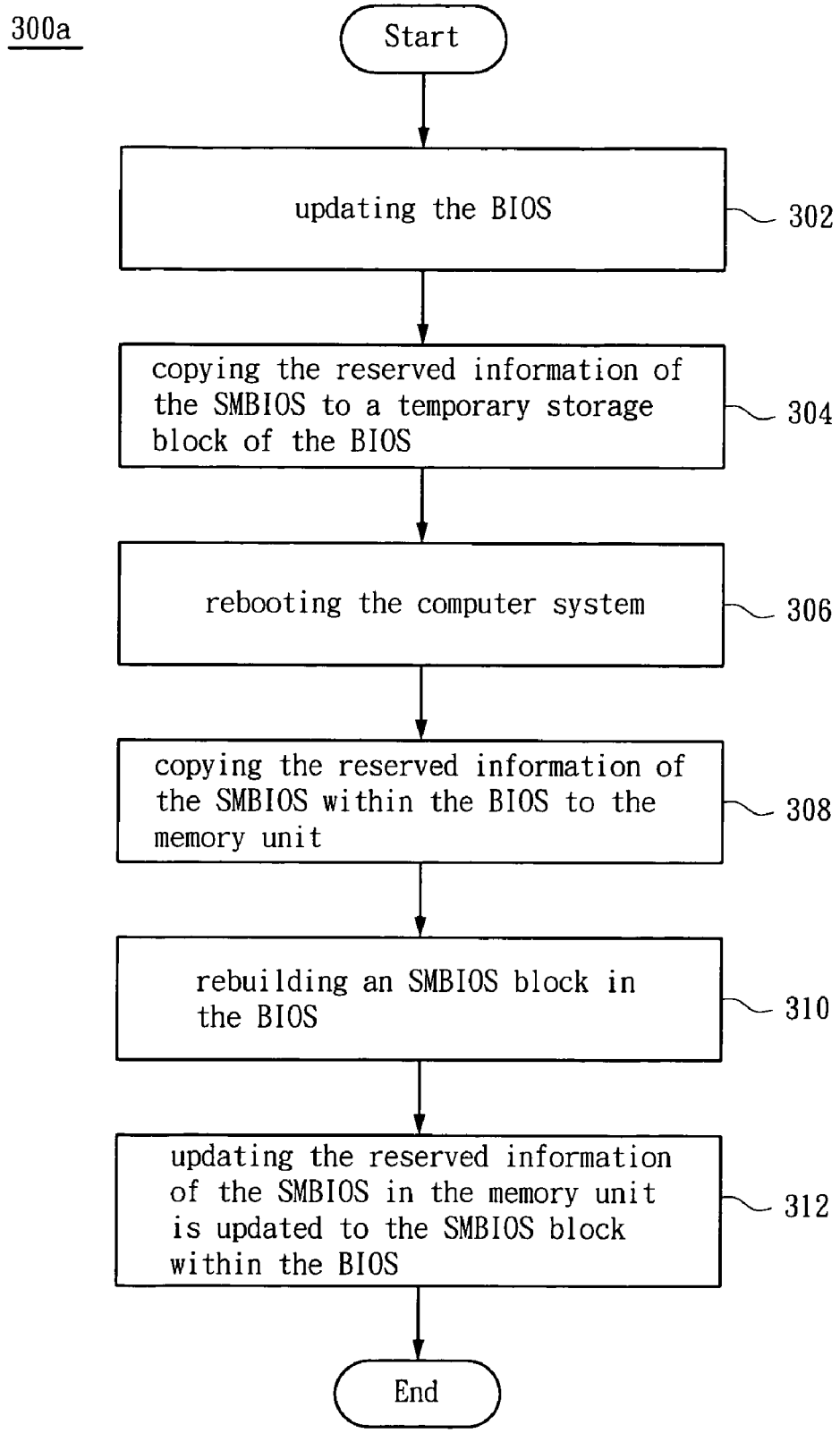
FIG. 2A is a flow chart of an embodiment of the method of the present invention.
Figure 2B:
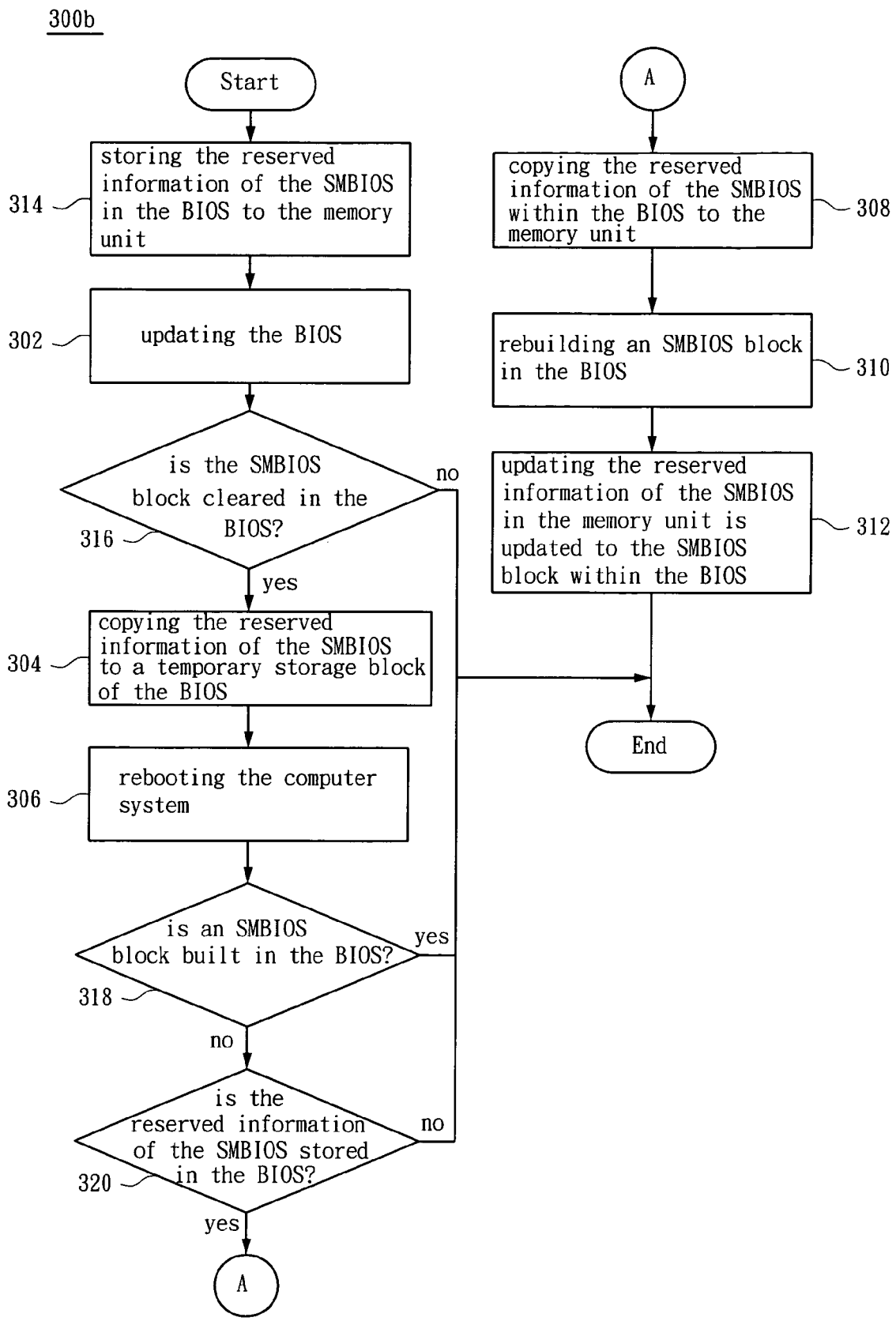
FIG. 2B is a flow chart of another embodiment of the method of the present invention.

FIG. 2B illustrates the flow 300b for another embodiment of the present invention, having additional optional steps added to the flowchart 300a illustrated in FIG. 2A.

In the flowchart 300a, it is assumed that the computer system copies BIOS data to the memory unit to be used after booting up. However, if the assumption is not established, that is, if the computer system is not equipped with the assumed function, step 314 shown in flowchart 300b needs to be performed before step 302 in order to copy the reserved SMBIOS information within the BIOS to the memory unit. Accordingly, the present method can be performed successfully as well. Further, the BIOS can be rebooted manually by the user or automatically by the computer system in step 306. There are also some additional determining steps in the flow 300b for increasing the efficiency of the present method. For instance, the step 316 is utilized to further determine if the SMBIOS in the BIOS is cleared after step 302. Step 304 is performed successively if the determining result is positive. Otherwise, the flow is terminated. Similarly, step 318 is utilized to determine whether a SMBIOS block is built into the BIOS after step 306. If it is determined that a SMBIOS block is built into the BIOS, the flow is terminated. Otherwise, the step 308 is performed successively. The other step 320 is utilized to determine whether the correct reserved SMBIOS information is stored in the BIOS after step 306. If yes, step 308 is performed successively. On the other hand, the flow is terminated if incorrect reserved SMBIOS information is stored. In another embodiment of the present invention, the identification code and the error detecting code are further adopted to determine whether the reserved SMBIOS information is correct. These determining steps are helpful to terminate the flow of the present invention at an early stage when the performing conditions are insufficient to improve the performance of the computer system.

Figure 3:
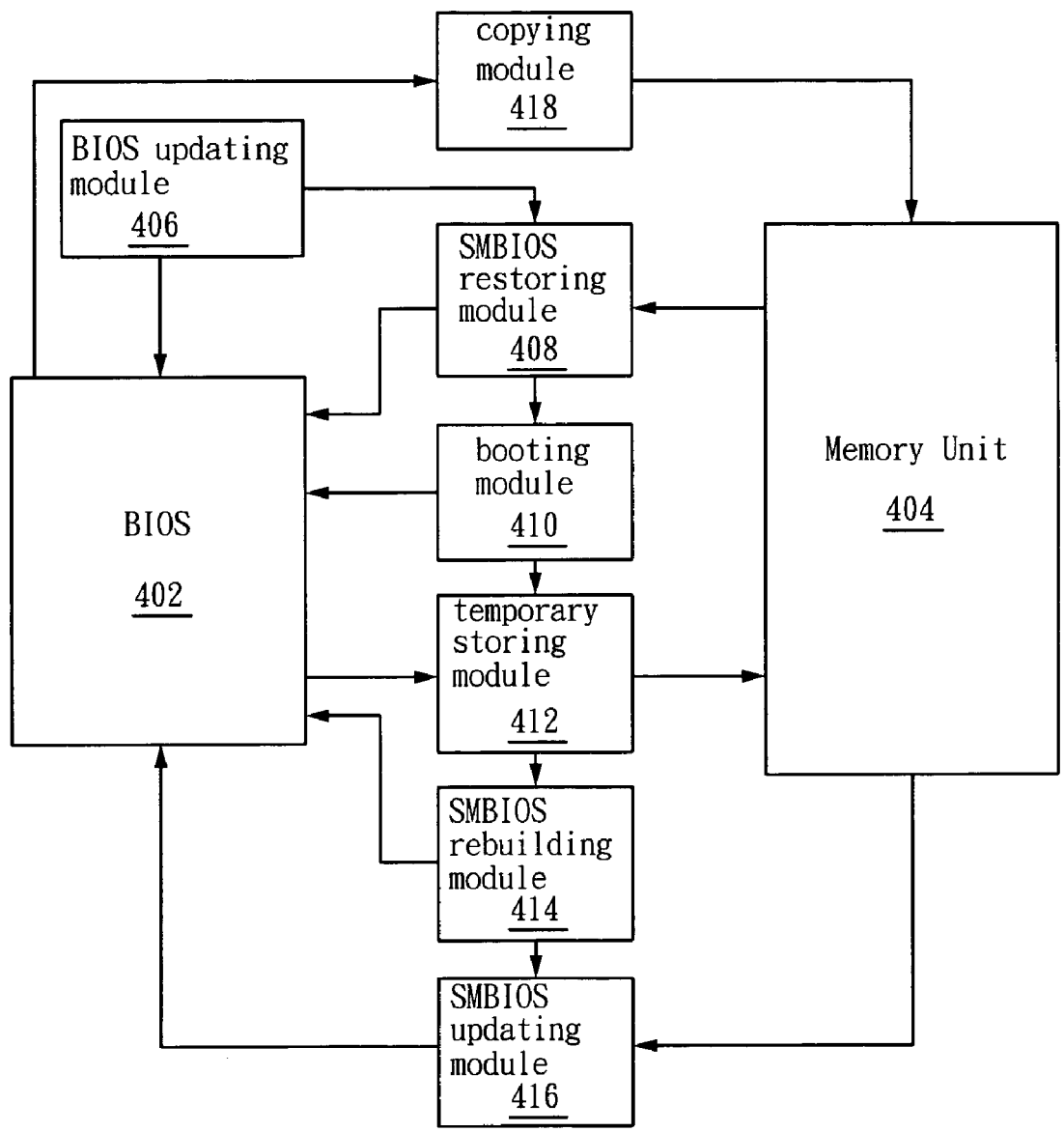
FIG. 3 is a structure diagram of an embodiment corresponding to the present invention.

According to the aforementioned method, a SMBIOS maintenance system is utilized to perform the maintaining process of the reserved SMBIOS information in a computer system. As illustrated in FIG. 3, the present maintaining system 400 includes a BIOS updating module 406, a SMBIOS restoring module 408, a booting module 410, a temporary storing module 412, a SMBIOS rebuilding module 414 and a SMBIOS updating module 416. The BIOS updating module 406 is utilized to perform an updating process to the BIOS 402 of the computer system. The SMBIOS restoring module 408 is utilized to store the reserved SMBIOS information previously stored within the memory unit 404 to the BIOS 402 after the BIOS updating module 406 finishes the updating process. For example, an identification code and an error detecting code of the reserved SMBIOS information can be stored in the BIOS 402 together. The booting module 410 is adopted for rebooting the computer system after the SMBIOS restoring module finishes the storing process. The temporary storing module 412 is utilized to temporarily store the reserved SMBIOS information within the BIOS 402 to the memory unit 404 after the computer system is rebooted. The SMBIOS rebuilding module 414 is in charge of rebuilding the SMBIOS block within the BIOS 402 after the temporary storing module 412 finishes its process. At end, the SMBIOS updating module 416 is utilized to write the reserved SMBIOS information back to the SMBIOS block of the BIOS 402 after the SMBIOS rebuilding module 414 finishes the building process.

For a computer system without the ability to actively copy data of the BIOS 402, such as the reserved SMBIOS information, to the memory unit 404, the present system needs to further include a copying module 418 to store the reserved SMBIOS information of the BIOS 402 to the memory unit 404 before the BIOS updating module 406 functions.

Although the present invention has been described in considerable detail with reference to certain preferred embodiments thereof, other embodiments are possible. Their spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for maintaining a System Management Basic Input and Output System (SMBIOS) in a computer system, comprising steps of:
   (a) updating a BIOS of the computer system;
   (b) storing a reserved SMBIOS information to a temporary storage block of the BIOS;
   (c) rebooting the computer system;
   (d) copying the reserved SMBIOS information to a memory unit;
   (e) building a SMBIOS block in the BIOS; and
   (f) updating the reserved SMBIOS information to the SMBIOS block.

2. The method for maintaining the SMBIOS of claim 1, wherein before step (a), the method further comprises a step for storing the reserved SMBIOS information in the BIOS to the memory unit.

3. The method for maintaining the SMBIOS of claim 1, wherein step (b) further comprises of storing an identification code and an error detecting code of the reserved SMBIOS information to the temporary storage block.

4. The method for maintaining the SMBIOS of claim 1, wherein between step (a) and step (b), the method further comprises a step of determining whether the SMBIOS block is cleared.

5. The method for maintaining the SMBIOS of claim 1, wherein between step (c) and step (d), the method further comprises a step of determining whether the BIOS comprises the SMBIOS block.

6. The method for maintaining the SMBIOS of claim 1, wherein between step (c) and step (d), the method further comprises a step of determining whether the correct reserved SMBIOS information is stored within the BIOS.

7. The method for maintaining the SMBIOS of claim 6, wherein an identification code and an error detecting code of the reserved SMBIOS information are utilized for determining whether the reserved SMBIOS information stored within the BIOS is correct.

8. The method for maintaining the SMBIOS of claim 1, wherein the reserved SMBIOS information comprises of a version of the information in the BIOS, a universal unique identifier (UUID) of the computer system, a manufacturer and a series number of a main board of the computer system, specification of a central unit of the computer system, sizes of a main memory and a flash memory of the computer system, an usage status of a data transmission interface socket of the computer system, or identification codes and series numbers of components of the computer system.

9. The method for maintaining the SMBIOS of claim 1, wherein data of the BIOS is stored in a non-volatile memory.

10. The method for maintaining the SMBIOS of claim 9, wherein the temporary storage block and the SMBIOS block occupies a same location within the non-volatile memory.

11. The method for maintaining the SMBIOS of claim 9, wherein the non-volatile memory comprises a flash memory.

12. The method for maintaining the SMBIOS of claim 1, wherein the memory unit comprises a random access memory (RAM).

13. A system for maintaining a System Management BIOS (SMBIOS) in a computer system, comprising:
   a BIOS updating module for updating a BIOS;
   a SMBIOS restoring module for storing a reserved SMBIOS information within a memory unit to a temporary storage block of the BIOS after the BIOS updated by the BIOS updating module;
   a booting module for rebooting the computer system after the reserved SMBIOS information stored by the SMBIOS restoring module;
   a temporary storing module for storing the reserved SMBIOS information within the temporary storage block to the memory unit after the computer system rebooted by the booting module;
   a SMBIOS rebuilding module for building a SMBIOS block in the BIOS after the reserved SMBIOS information stored by the temporary storing module; and
   a SMBIOS updating module for updating the reserved SMBIOS information to the SMBIOS block after the SMBIOS block in the BIOS rebuilt by the SMBIOS rebuilding module.

14. The system for maintaining the SMBIOS of claim 13, further comprising a copying module for storing reserved SMBIOS information within the BIOS to the memory unit before the BIOS is updated.

15. The system for maintaining the SMBIOS of claim 13, wherein the SMBIOS restoring module is further stores an identification code and an error detecting code of the reserved SMBIOS information to the temporary storage block.

16. The system for maintaining the SMBIOS of claim 13, wherein the temporary storing module first utilizes an identification code and an error detecting code of the reserved SMBIOS information to determine whether the reserved SMBIOS information stored within the temporary storage block is correct, and then stores the reserved SMBIOS information within the temporary storage block to the memory unit if the reserved SMBIOS information within the temporary storage block is determined to be correct.

17. The system for maintaining the SMBIOS of claim 13, wherein the reserved SMBIOS information comprises version information of the BIOS, an universal unique identifier (UUID) of the computer system, a manufacturer and a series number of a main board of the computer system, and specification of a central unit of the computer system, and further comprises sizes of a main memory and a flash memory of the computer system, an usage status of a data transmission interface socket of the computer system, or identification codes and series numbers of components of the computer system.

18. The system for maintaining the SMBIOS of claim 13, wherein data of the BIOS is stored in a non-volatile memory.

19. The system for maintaining the SMBIOS of claim 18, wherein the non-volatile memory comprises a flash memory.

20. The system for maintaining the SMBIOS of claim 13, wherein the memory unit comprises a random access memory (RAM).

* * * * *